United States Patent
Ogawa

(10) Patent No.: US 8,280,016 B2
(45) Date of Patent: Oct. 2, 2012

(54) COMMUNICATION TERMINAL DEVICE AND RECEPTION CONTROLLING METHOD FOR COMMUNICATION TERMINAL DEVICE

(75) Inventor: Kimiaki Ogawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 840 days.

(21) Appl. No.: 12/423,924

(22) Filed: Apr. 15, 2009

(65) Prior Publication Data

US 2009/0316192 A1    Dec. 24, 2009

(30) Foreign Application Priority Data

Jun. 20, 2008  (JP) ................ 2008-161226

(51) Int. Cl.
 *H04M 11/00*   (2006.01)
(52) U.S. Cl. ........ 379/100.01; 379/100.02; 379/100.05
(58) Field of Classification Search ............. 379/100.01, 379/100.02, 100.05, 100.06, 100.12, 93.23, 379/106.01, 106.08, 106.09, 142.01, 142.03, 379/127.01; 358/440, 400, 405, 468
See application file for complete search history.

(56) References Cited

U.S. PATENT DOCUMENTS 5,898,506 A * 4/1999 Itoh ............................... 358/434

FOREIGN PATENT DOCUMENTS

JP      2004-289212 A    10/2004

* cited by examiner

*Primary Examiner* — Melur Ramakrishnaiah
(74) *Attorney, Agent, or Firm* — Marvin A. Motsenbocker; Mots Law, PLLC

(57) ABSTRACT

An aspect of the invention provides a communication terminal device that comprises: a communication counterpart information notification contract determination unit configured to determine if a counterpart communication terminal device communication received through a line has a communication counterpart information notification contract; and a communication controller configured to change a communication time parameter when the communication counterpart information notification contract determination unit determines that the counterpart communication terminal device of the received communication has the communication counterpart information notification contract.

14 Claims, 16 Drawing Sheets

COMMUNICATION TERMINAL DEVICE AND RECEPTION CONTROLLING METHOD FOR COMMUNICATION TERMINAL DEVICE

CROSS REFERENCE TO RELATED APPLICATIONS

This application claims priority based on 35 USC 119 from prior Japanese Patent Application No. P2008-161226 filed on Jun. 20, 2008, entitled "Communication Terminal Device and Reception Controlling Method for Communication Terminal Device", the entire contents of which are incorporated herein by reference.

BACKGROUND OF THE INVENTION

1. Field of the Invention

This invention relates to a communication terminal device having a facsimile communicating function and a reception controlling method for a communication terminal device.

2. Description of Related Art

Currently, IP (Internet Protocol) networks are widely used and calling number display services are offered. In some cases, in order to perform facsimile communications, a communication terminal device having a facsimile function is connected to a terminal adapter (TA) to establish connection with an IP line, and is subscribed to the calling number display service.

Japanese Patent Application Publication No. 2004-289212 discloses a facsimile device configured to perform facsimile communications using a modem that conforms to the communication mode of the network to which it is connected and by considering delays at the same time.

Referring to FIGS. 4 to 7, description is provided for conventional operation of a receiver having a facsimile function and configured to perform facsimile communication connected to an IP line and subscribed to the calling number display service.

FIG. 4 is an operation time chart for a first related art receiver. The response time of an unillustrated receiver, i.e., the time for which the receiver waits to recognize an incoming call after the arrival of a first ring signal, may be set to any one of one ring after 5 seconds, after 10 seconds, after 15 seconds, and after 20 seconds. Moreover, in this example, the minimum value of ring signal ON time, i.e., the minimum length of time during which the ring signal needs to be ON to be determined an effective ring signal, is set to 650 ms. The modem function may be either V. 34 or V. 17.

When a facsimile communication call comes from an unillustrated transmitter at the other end of the communication (hereinafter simply called a counterpart), a ring signal (401) comes from an exchange to the receiver. Since the minimum value of the ring signal ON time is set to 650 ms, the ring signal (401) having the ON time for 0.5 seconds is determined not-effective.

Even if the response time is set to "one ring," the receiver determines that an information reception terminal start signal (401), which is the ring signal, is not an incoming call. Accordingly, the exchange neither operates in a number display sequence nor sends out a MODEM signal to indicate inclusion of the telephone number of the transmitter (411). Determining not to operate the number display signal sequence, the exchange sends out a subsequent ring signal (412) after a certain time period. This signal has an ON time of 0.25 to 0.3 seconds. Accordingly, this signal is not determined effective according to the minimum value of the ring signal ON time, which is set to 650 ms. Therefore, the receiver cannot receive a call and proceed with communication (413) even when the response time reaches a time-out.

FIG. 5 is an operation time chart for a second related art receiver. A setting of response time of an unillustrated receiver is determined as "one ring." Moreover, the minimum value of the ring signal ON time is set to 200 ms (510). The modem function may be either V. 34 or V. 17.

When a facsimile communication call comes from an unillustrated counterpart communication terminal, a ring signal (501) comes from an exchange to the receiver. Since the minimum value of the ring signal ON time is 200 ms, the ring signal (501) having the ON time of 0.4 to 0.6 seconds is determined effective.

Moreover, since the response time is set to "one ring," the receiver connects to a line (512) upon arrival of the first ring signal (501). As the receiver determines that an information reception terminal start signal (501) which is the ring signal (501) is an incoming call, the exchange operates in the number display sequence and sends out a MODEM signal including a telephone number of the transmitter (513). To perform facsimile reception, the receiver sends out an ANSam signal (an amplitude-modulated answer tone) signal when the modem function is V. 34, or sends out a CED signal (a single tone at 2100 Hz) when the modem function is V. 17. However, since the exchange is operating in the number display sequence, the exchange blocks the signal transmitted from the receiver, and consequently the receiver fails to establish communication (514).

FIG. 6 is an operation time chart for a third related art receiver. A response time of the receiver may be set as any one of 10 seconds, 15 seconds, and 20 seconds. Here, the response time is set to 10 seconds (610). The minimum value of a ring signal ON time is set to 650 ms. The modem function may be either V. 34 or V. 17.

When a facsimile communication call comes from an unillustrated counterpart communication terminal, a ring signal (601) comes from an exchange to the receiver. Since the minimum value of the ring signal ON time is 650 ms, the ring signal (601) having the ON time of 0.5 seconds is determined not-effective.

The receiver does not determine that an information reception terminal start signal (601), which is the ring signal (601), is an incoming call. Accordingly, the exchange neither operates in the number display sequence, nor sends out a MODEM signal that indicates inclusion of a telephone number of the transmitter (612). Determining not to operate the number display signal sequence, the exchange sends out a next ring signal (613) after a certain time period. This signal has the ON time of 0.25 to 0.3 seconds. Accordingly, this signal is determined not-effective according to the minimum value of the ON time which is 650 ms. Therefore, the receiver cannot recognize the incoming call at a time-out of the response time (614) and fails to proceed with communications (615).

FIG. 7 is an operation time chart for a fourth related art receiver. The response time of the receiver may be set to any one of 10 seconds, 15 seconds, and 20 seconds. Here, the response time is set to 10 seconds (710). The minimum value of a ring signal ON time is set to 200 ms (711). The modem function is assumed to be V. 34.

When a facsimile communication call comes from an unillustrated counterpart communication terminal, a ring signal (701) comes from an exchange to the receiver. Since the minimum value of the ring signal ON time is 200 ms, the ring signal (701) having the ON time of 0.4 to 0.6 seconds is determined effective.

However, since the response time is "10 seconds," the receiver does not determine that an information reception terminal start signal (701), which is the ring signal (701), is an incoming call. Accordingly, the exchange neither operates in the number display sequence nor sends out a MODEM signal that indicates inclusion of a telephone number of the transmitter (713). The exchange determines that the signal does not represent the number display sequence and sends out a next ring signal (714) after a certain time period. This signal has the ON time of 0.25 to 0.3 seconds and is therefore determined effective according to the minimum value of the ON time which is 200 ms. The receiver connects to line (716) at a time-out of the response time (715). However, when connection to the IP line is established, a communication error may occur (716).

As described above, the first to fourth related art examples have the following problems: a failure to establish communication may occur due to, for example, the influence of a delay or discard of a packet on the IP line; a failure to establish communication may also occur because the exchange which is operating in the number display sequence blocks the signal sent from the receiver to the transmitter; and the receiver cannot recognize an incoming call because a ring signal sent from a TA (terminal adaptor) is ambiguous.

SUMMARY OF THE INVENTION

An aspect of the invention provides a communication terminal device that comprises: a communication counterpart information notification contract determination unit configured to determine if a counterpart communication terminal device communication received through a line has a communication counterpart information notification contract; and a communication controller configured to change a communication time parameter when the communication counterpart information notification contract determination unit determines that the counterpart communication terminal device of the received communication has the communication counterpart information notification contract.

According to the communication terminal device, it is possible to receive a facsimile signal reliably on communication networks having mixed communication protocols and various contract forms.

Another aspect of the invention provides a reception control method for a communication terminal device that comprises: detecting whether a counterpart communication terminal device has a communication counterpart information notification contract, based on a ring signal included in a signal received from a line; and changing a communication time parameter when a result of the detection indicates that the counterpart communication terminal device has the communication counterpart information notification contract.

DETAILED DESCRIPTION OF EMBODIMENTS

Figure 1:
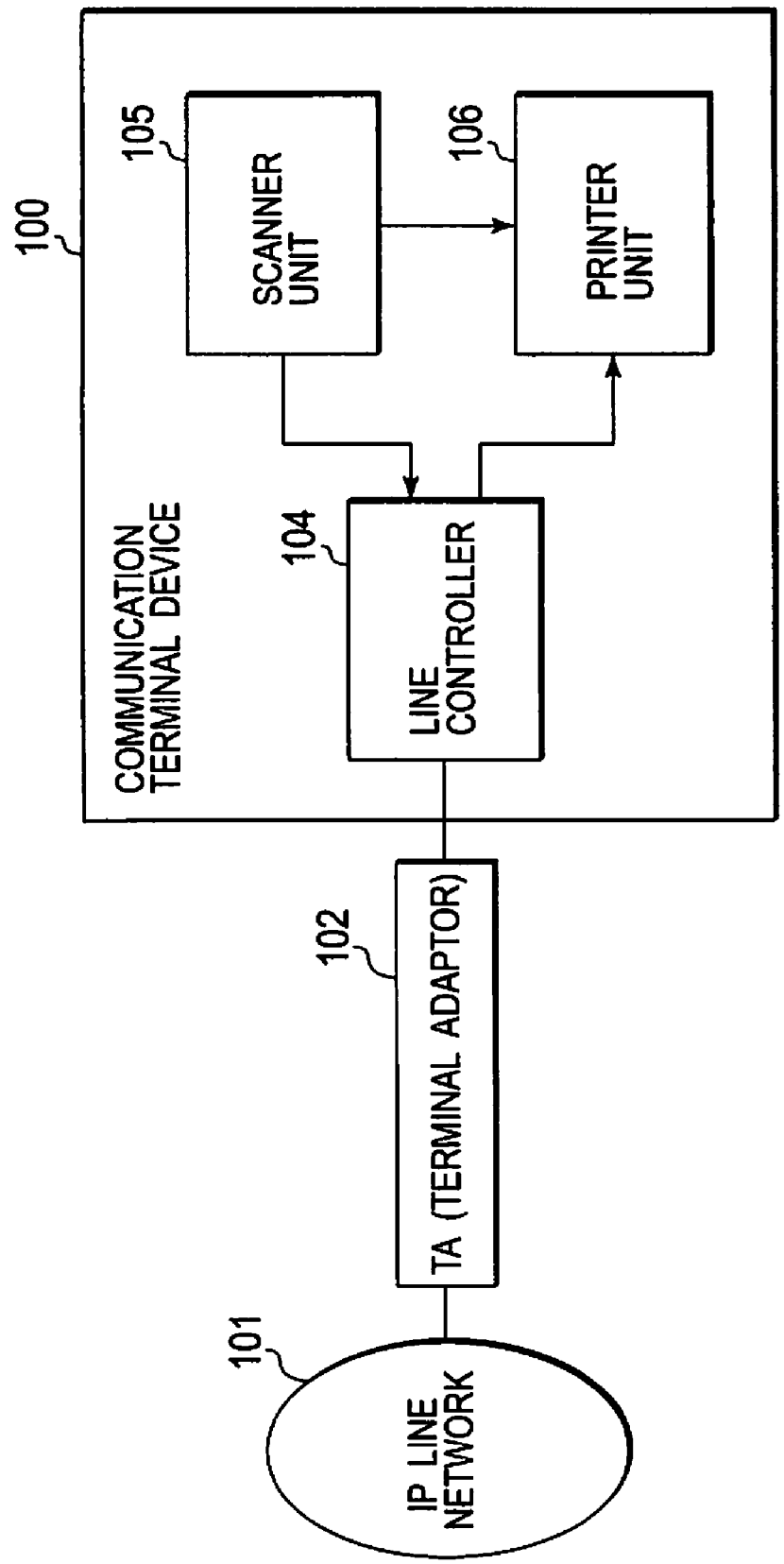
FIG. 1 is a diagram of the connection between a communication terminal device and an Internet Protocol (IP) line network according to a first embodiment.

Descriptions are provided for embodiments based on the drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

First Embodiment

FIG. 1 is a diagram of the connection between a communication terminal device and an Internet Protocol (IP) line network according to a first embodiment. IP line network 101 is connected to TA (terminal adaptor) 102. TA (terminal adaptor) 102 is connected to line controller 104 inside communication terminal device 100. Line controller 104 is connected to scanner unit 105 configured to read a document and printer unit 106 configured to print an image on a recording medium. Scanner unit 105 is connected to printer unit 106. The document read out by scanner unit 105 is transmitted to an unillustrated counterpart communication terminal as a facsimile via circuit controller 104. The document read out by the unillustrated counterpart communication terminal is printed out by printer unit 106 via line controller 104 when sent as a facsimile. When the document is read out by scanner unit 105 as a photocopy, the document is printed out by printer unit 106.

Figure 2:
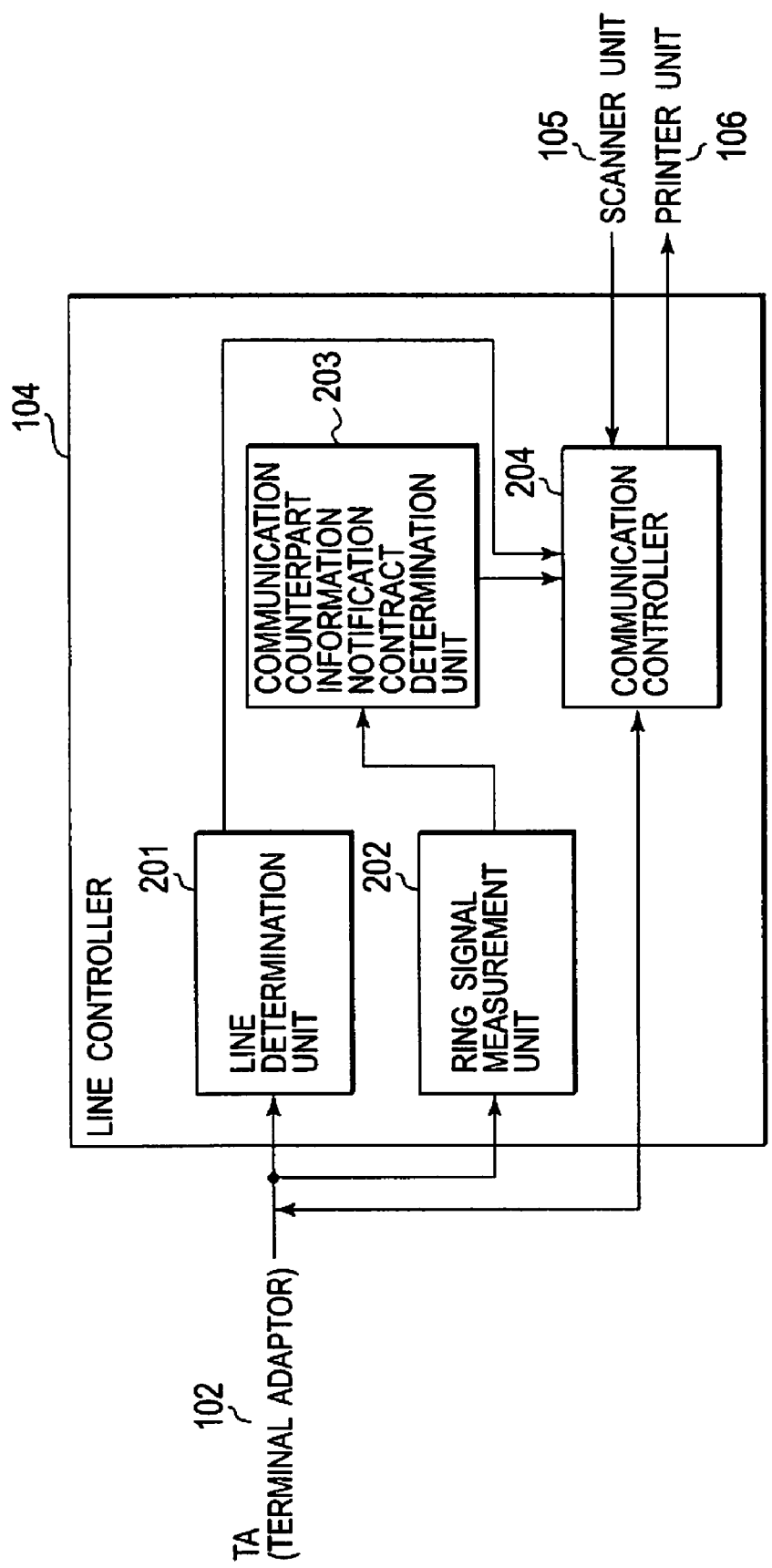
FIG. 2 is a block diagram showing a line controller in the first embodiment.

FIG. 2 is a block diagram of line controller 104 in the first embodiment. Upon arrival of a facsimile communication call, line determination unit 201 determines if connection to the IP line is established. When a ring signal, to be described later, comes from TA (terminal adaptor) 102, ring signal measurement unit 202 measures ON time and OFF time of the ring signal and determines if the measured values represent values of an information reception terminal start signal. When there is a notice from ring signal measurement unit 202 indicating that the ring signal is the information reception terminal start signal, communication counterpart information notification contract determination unit 203 determines that the counterpart communication terminal device has a contract for a calling number display service to be described later. Communication controller 204 changes communication time parameters including "response time" and the "minimum value of a ring signal ON time."

TA (terminal adaptor) 102 is connected to line determination unit 201, ring signal measurement unit 202, and communication controller 204 of line controller 104. Line determination unit 201 is connected to communication controller 204. Ring signal measurement unit 202 is connected to communication counterpart information notification contract determination unit 203. Communication counterpart information notification contract determination unit 203 is connected to communication controller 204 and communication controller 204 is connected to scanner unit 105 and printer unit 106.

Figure 3:
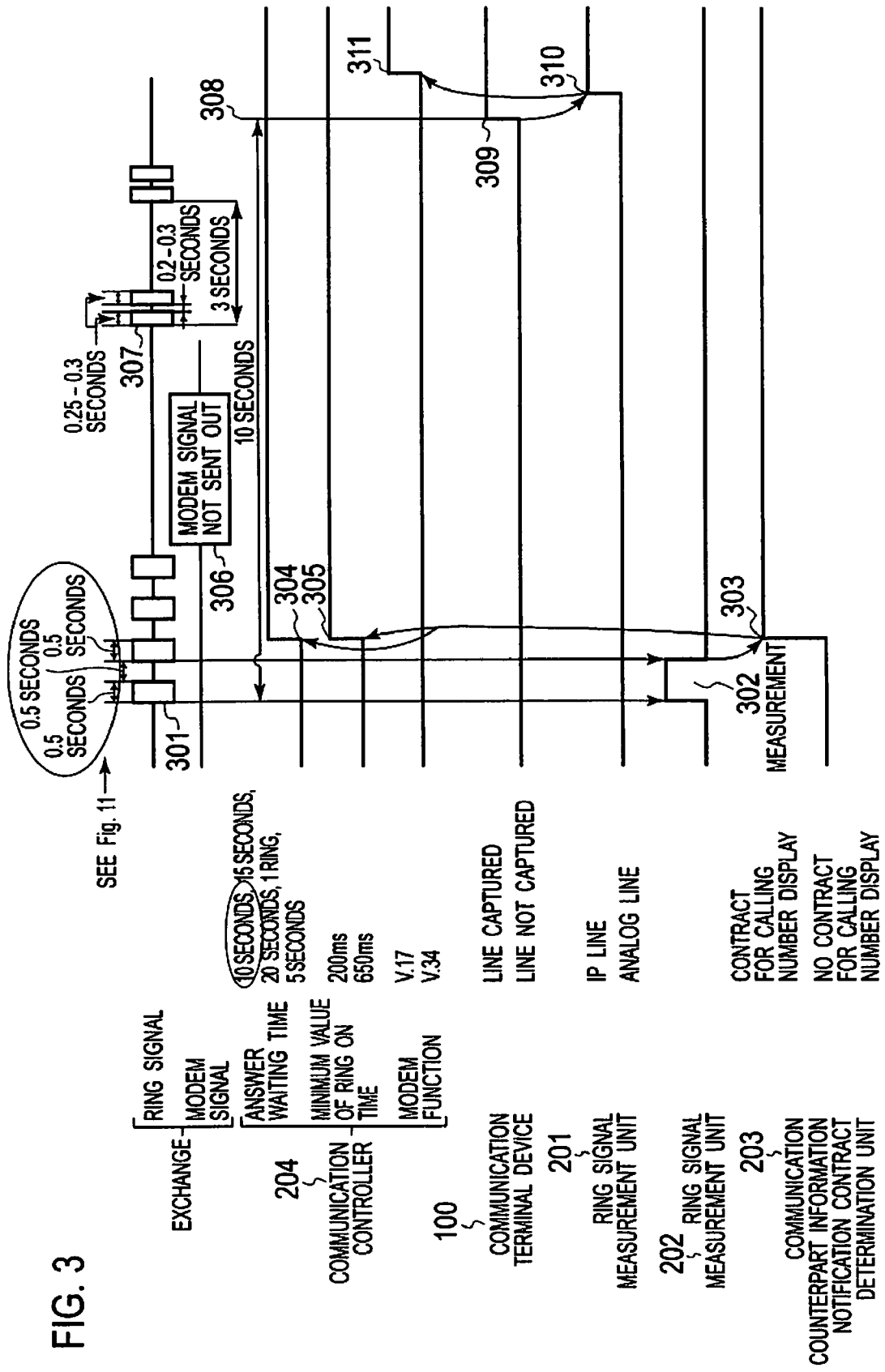
FIG. 3 is an operation time chart of the communication terminal device in the first embodiment.
Figure 4:
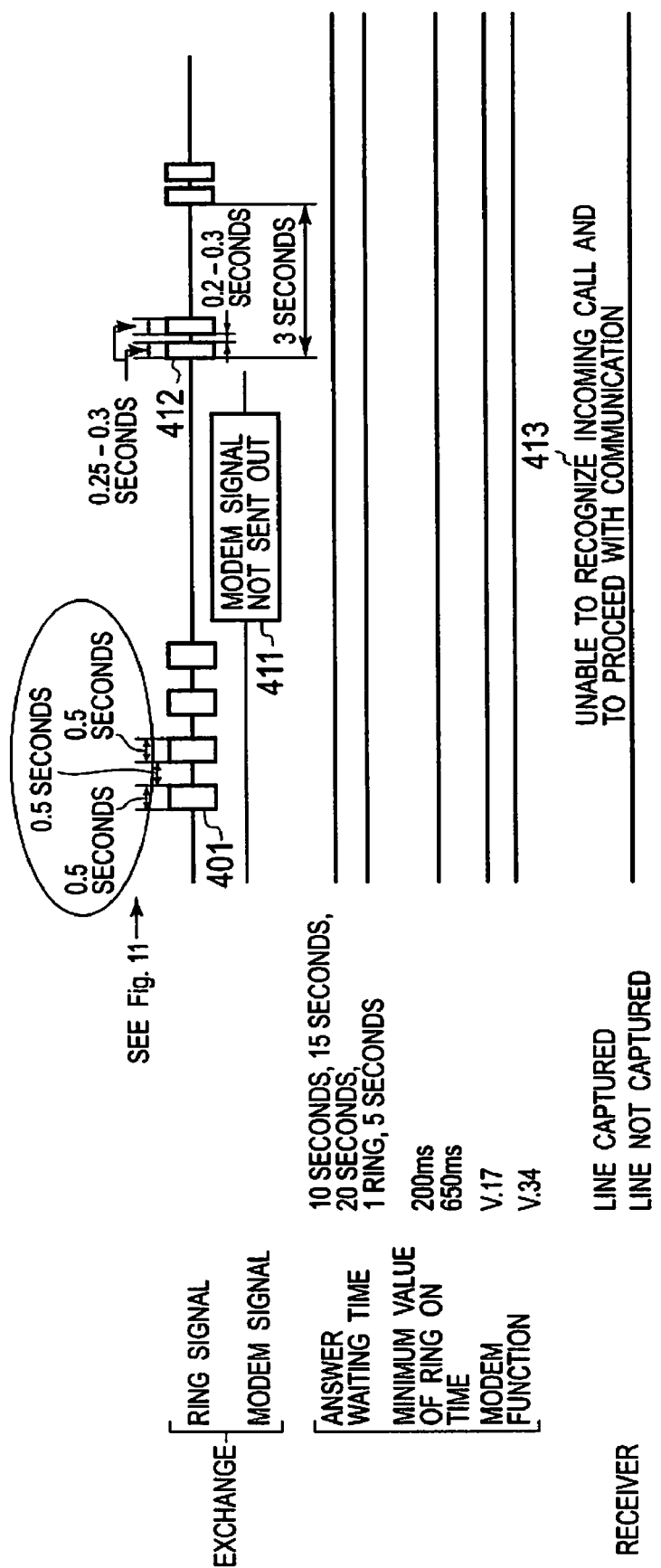
FIG. 4 is an operation time chart of a receiver showing a first related art.
Figure 5:
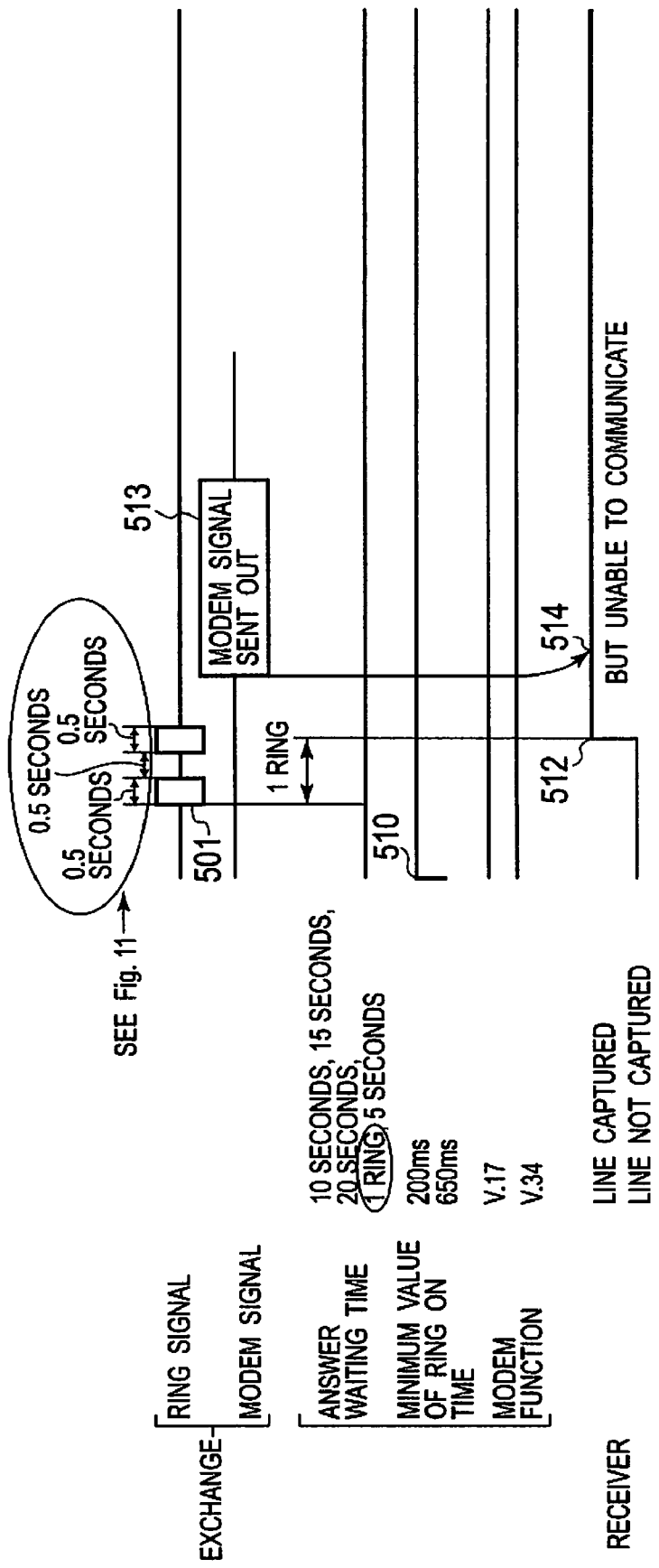
FIG. 5 is an operation time chart of a receiver showing a second related art.
Figure 6:
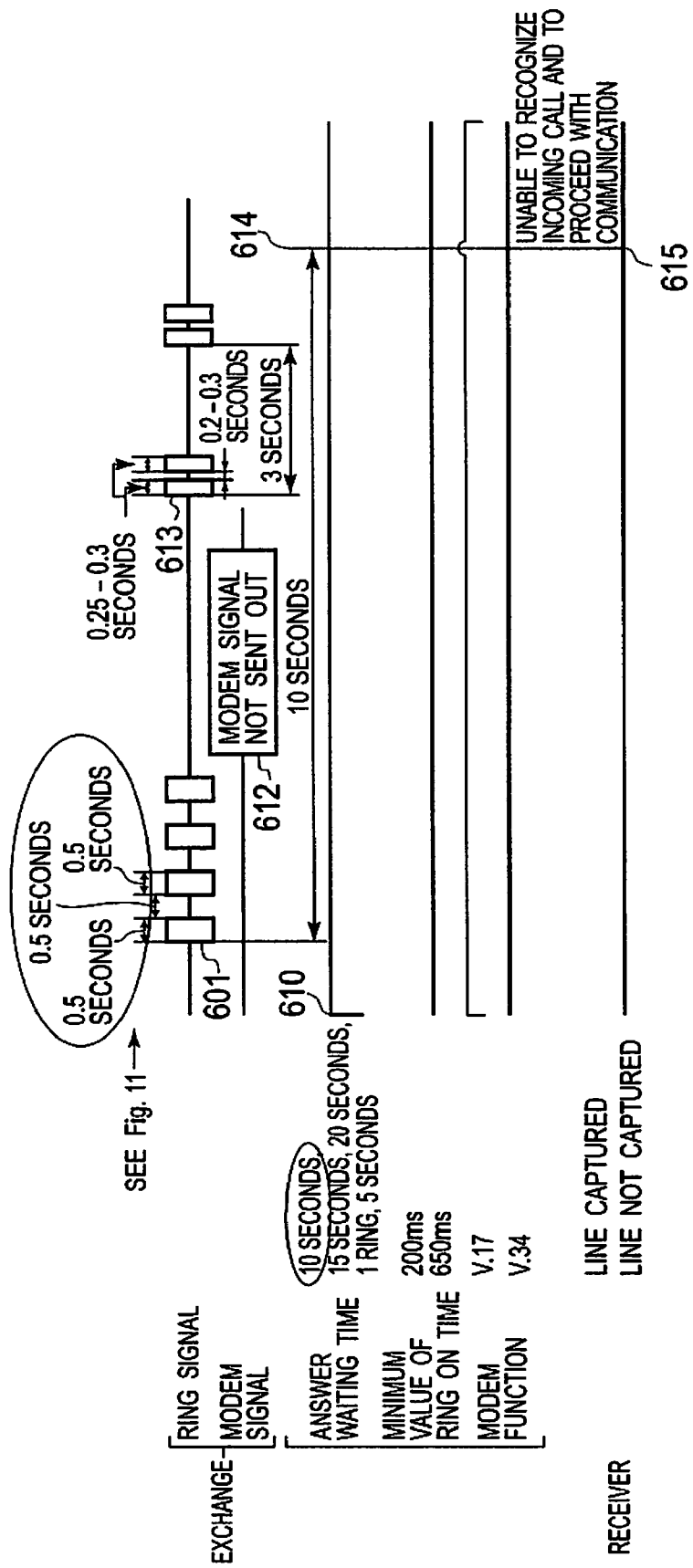
FIG. 6 is an operation time chart of a receiver showing a third related art.
Figure 7:
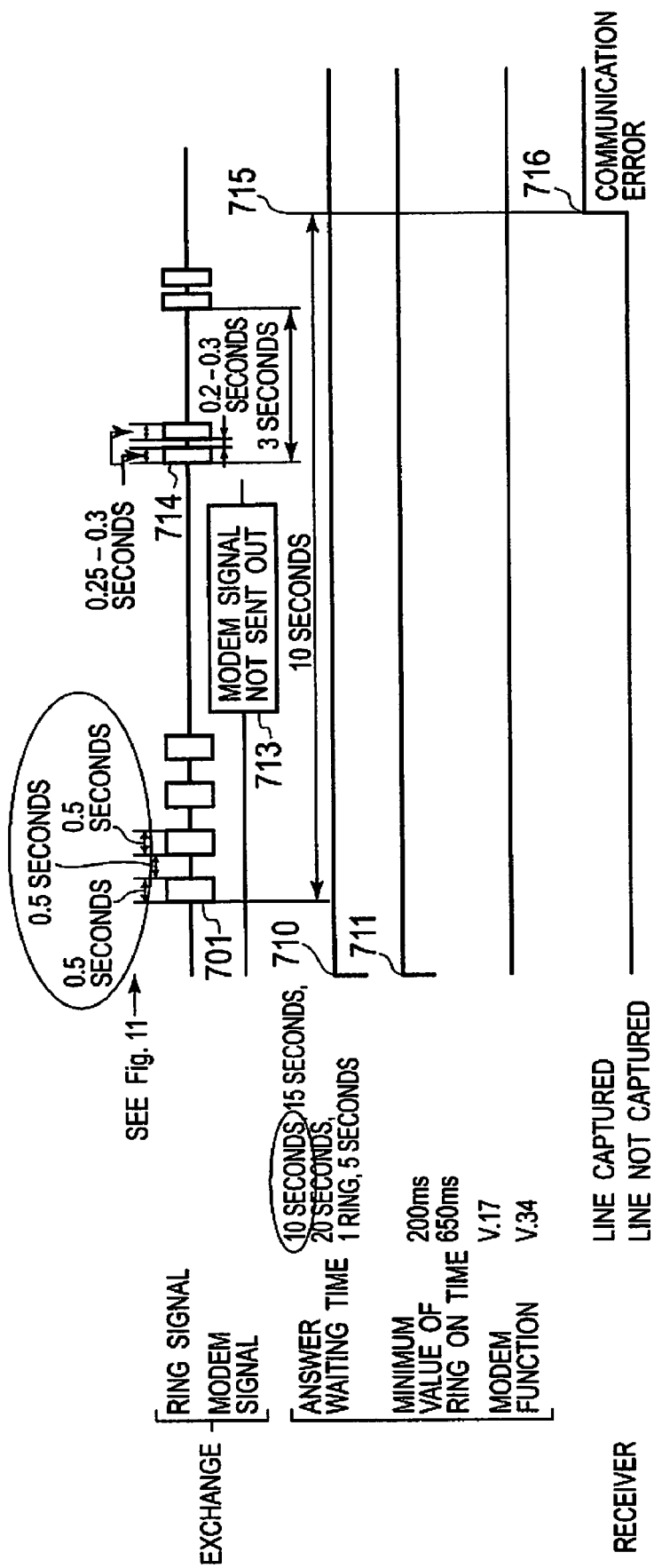
FIG. 7 is an operation time chart of a receiver showing a fourth related art.

Operations of the first embodiment are now described. FIG. 3 is an operation time chart of communication terminal device 100 in the first embodiment. When a facsimile communication call comes from the unillustrated counterpart communication terminal, a ring signal (301) comes from an unillustrated exchange to communication terminal 100. The ring signal (301) is also called an information reception terminal start signal (301) (hereinafter referred to as either the ring signal or the information reception terminal start signal), which is a repeated signal with a total time duration of 1 second including ON time and OFF time, where the ON time is in a range from 0.4 to 0.6 seconds and the OFF time is in a range from 0.4 to 0.6 seconds.

The ON time and OFF time in this information reception terminal start signal (301) are measured (302) by ring signal measurement unit 202 of line controller 104. When ring signal measurement unit 202 determines that the measured values represent the values as the information reception terminal start signal (301), ring signal measurement unit 202 issues a notice to communication counterpart information notification contract determination unit 203. Upon receipt of the notice, communication counterpart information notification contract determination unit 203 determines that the counterpart communication terminal device has a contract for the calling number display service (303). Here, the "calling number display service" is a service to display the content of notice (a telephone number) of the caller on communication terminal device 100 on the receiving side or to inform the content of notice by use of a voice, for example. This service is executed based on the contract agreed upon by a user. Therefore, the "determination as to whether the counterpart communication terminal device has a contract for the calling number display service" is equivalent to the "determination as to whether or not the calling number display service is to be executed."

When communication counterpart information notification contract determination unit 203 determines that the counterpart communication terminal device has a contract for the calling number display service, communication controller 204 changes one of the communication time parameters (304), namely, the "response time." This "response time" is the waiting time for which communication terminal device 100 of the receiving side waits to recognize an incoming call after the arrival of the ring signal. Specifically, the "response time" is the time set for the waiting time for which the receiver waits to recognize an incoming call after the arrival of a first ring signal (301). The possible set values may include, for example, after one ring (an incoming call is received immediately after one ring signal), after 5 seconds (an incoming call is received 5 seconds after the arrival of the ring signal), after 10 seconds, after 15 seconds, or after 20 seconds. In this case, the setting is assumed to be changed to 10 seconds.

Meanwhile, communication controller 204 changes the setting of another communication time parameter, namely, the "minimum value of the ring signal ON time from a current value of 650 ms to 200 ms, for example (305). This "minimum value of the ring signal ON time" is the minimum value of the ON time during which the ring signal needs to be ON to be determined as effective. Specifically, the ring signal becomes effective when the value of the ON time of the ring signal is greater than the value set as the minimum value. Here, the minimum value of the ring signal ON time is changed to 200 ms. Accordingly, the ring signal (301) shown in FIG. 3 can be surely recognized as the incoming call.

Since the response time is changed to "10 seconds" (304) as described previously, communication terminal 100 does not recognize the information reception terminal start signal (301) as the incoming call at this point. Accordingly, the exchange does not send out a MODEM signal (306). This "MODEM signal" is the signal that includes a telephone number and the like of the communication terminal device of the transmitting side, and is sent out by the exchange which is operating in a calling number display sequence in response to the arrival of the information reception terminal start signal (301) at communication terminal device 100. When the exchange determines not to operate in the calling number display sequence, a subsequent ring signal (307) is sent out after a certain time period. This ring signal (307) has the ON time of 0.25 to 0.3 seconds as shown in FIG. 3, and is also called a double ring. As described previously, since the setting of the minimum value of the ring signal ON time is changed to 200 ms (305), this ring signal (307) is effective.

At a time-out of the response time (308), communication terminal device 100 connects a line (309). Line determination unit 201 determines whether or not the line is an analog line. When determined as the IP line (310), line determination unit 201 changes the model function of communication controller 204 from V. 34 to V. 17 (311). In this way, communication terminal device 100 can perform reception normally.

Detailed operations of the respective units are described below. First, line determination unit 201 is described. The facsimile communication call comes from the unillustrated counterpart communication terminal. Line determination unit 201 automatically determines if connection to the IP line is established. This operation is described below.

Figure 8:
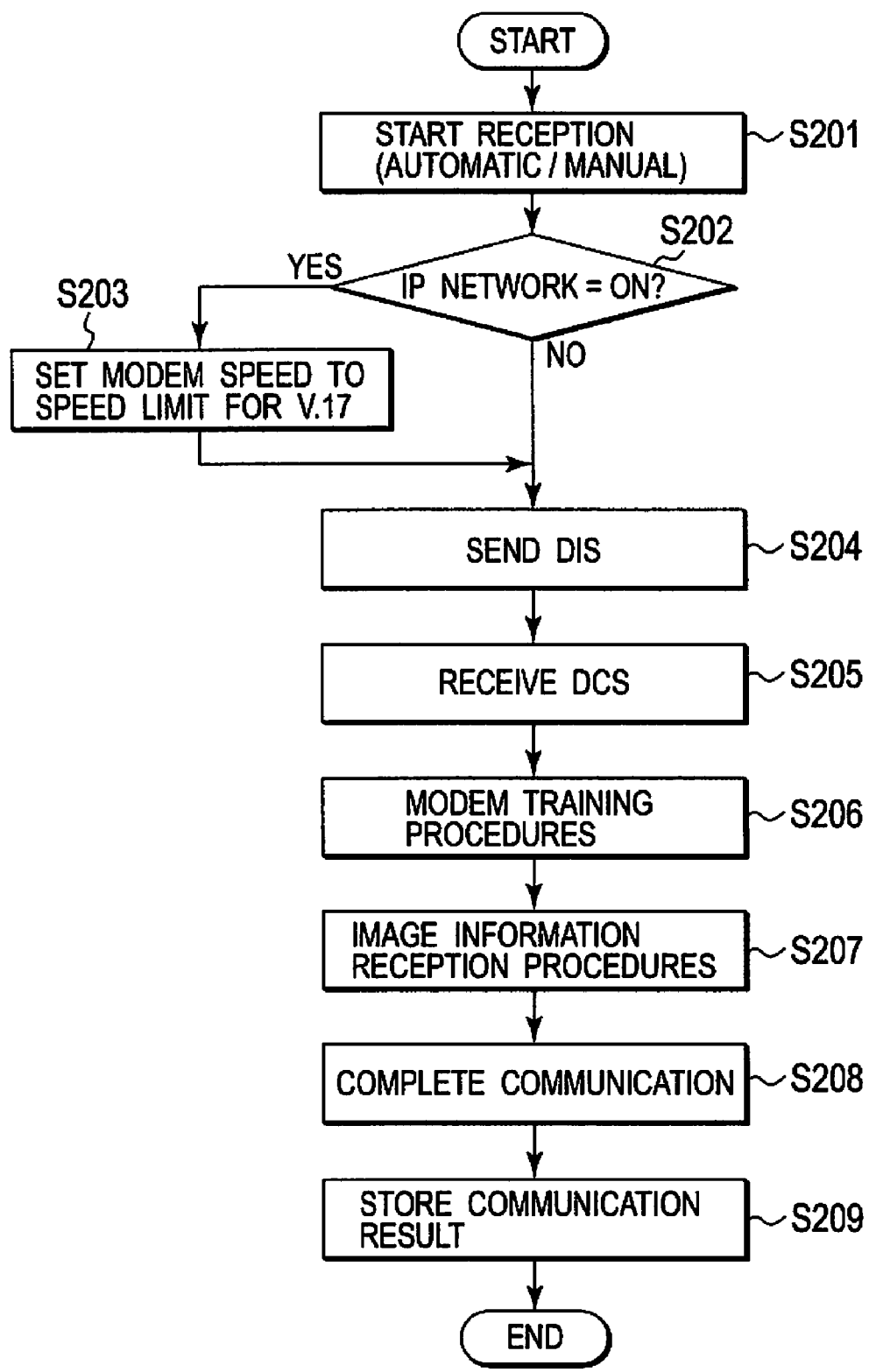
FIG. 8 is a flowchart for explaining an operation for determining connection to an IP network.

FIG. 8 is a flowchart for explaining an operation for determining whether or not connection to the IP line is established. In particular, this is the operation at the time of reception by communication terminal device 100. Communication terminal device 100 starts reception control (Step 201) upon receipt of an instruction of either automatic reception or manual reception. A value of the ON-AND-OFF area of an unillustrated IP network is checked. When the value is ON (Yes in Step 202), a speed limit of a V. 17 modem is set. When Step 202 results in No and after the setting in Step 203, communication terminal device 100 sends a signal DIS for notifying a communication capability such as the set modem speed to the counterpart terminal (Step 204) and receives a signal DCS from the counterpart terminal (Step 205).

Subsequently, a predetermined modem training procedure is executed at the set modem speed and the modem speed to be used for communication with the counterpart terminal is determined (Step 206). Thereafter, a predetermined information reception procedure for receiving image information is executed (Step 207). When this image information reception is completed, the line is restored (Step 208) and a result of the communication is stored in an unillustrated communication management record storage area (Step 209). Accordingly, the series of operations are terminated.

Figure 9:
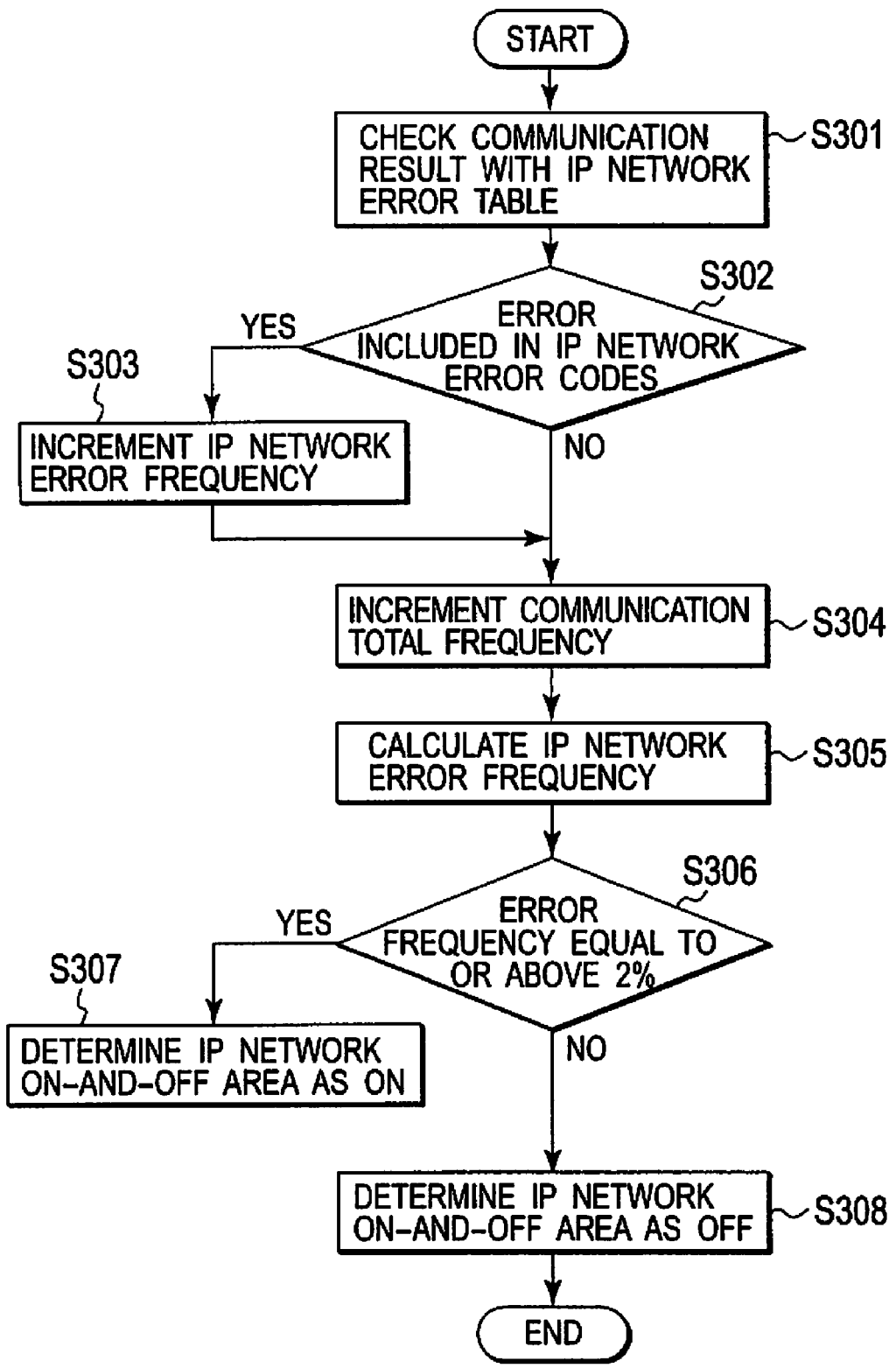
FIG. 9 is a flowchart for explaining an operation to change a set value of an IP network ON-AND-OFF area.

At this time, the set value of the IP network ON-AND-OFF area is changed in accordance with a flowchart shown in FIG. 9. FIG. 9 is another flowchart for explaining the operation for determining whether or not connection to the IP line is established. This drawing shows the operation at the time of changing the communication protocol. The above-described FIG. 8 represents the flow when the communication is executed normally, in which the record indicating normal completion is stored in the unillustrated communication management record storage area. Meanwhile, an IP network error may occur when executing the communication in accordance with the ITU-T V. 34 protocol using IP line network 101. Accordingly, an error unique to the IP network is recorded in the communication management record storage area. In that case, the set value of the IP network ON-AND-OFF area is changed in accordance with the flowchart shown in FIG. 9.

First, the most recent result in the unillustrated communication management record storage area is checked against an unillustrated IP network error table (Step 301). When the error matches the IP network error table (Yes in Step 302), a value in an unillustrated IP network error frequency area is incremented (Step 303). Moreover, a value in an unillustrated communication total frequency area is incremented (Step 304) and then an IP network error occurrence frequency is calculated by use of an unillustrated error frequency calculation unit (Step 305).

An unillustrated IP network determination unit defines the value of the IP network ON-AND-OFF area as ON (Step 307) when the calculated IP network error occurrence frequency is equal to or above a predetermined value (2%) (Yes in Step 306), or defines the value of the IP network ON-AND-OFF area as OFF (Step 308) when the calculated IP network error occurrence frequency does not exceed the predetermined value (2%) (No in Step 306).

In this way, connection to the IP line is determined based on the value of the IP network ON-AND-OFF area. When there is a connection to the IP line, communication controller 204 is caused to operate as the V. 17 modem function. A transmission rate in this case is 14.4 Kbps. When connection to the IP line is established, communication controller 204 is caused to operate as the V. 34 modem function. The transmission rate in this case is 33.6 Kbps.

Figure 10:
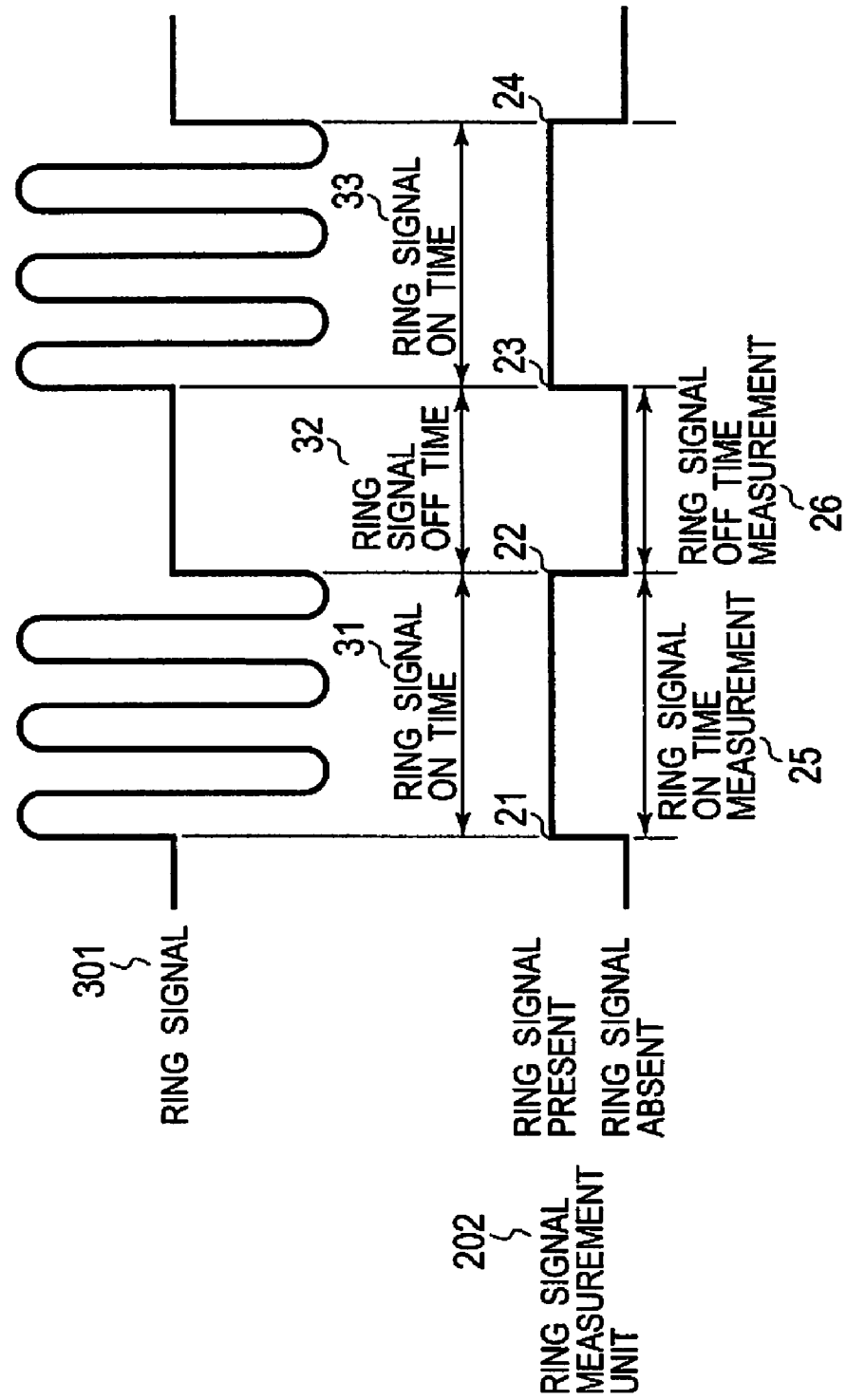
FIG. 10 is an explanatory view showing time measurement of a ring signal.

Next, the time measurement of the ring signal to be executed by ring signal measurement unit 202 is described. FIG. 10 is an explanatory view showing the time measurement of the ring signal. When the ring signal comes from TA (terminal adaptor) 102, ring signal measurement unit 202 measures the ON time and the OFF time in the ring signal. Ring signal measurement unit 202 detects ring signal presence 21 by using first ring signal ON time 31. As ring signal ON time 31 changes into ring signal OFF time 32, ring signal measurement unit 202 detects ring signal absence 22. Ring signal measurement unit 202 measures the time from ring signal presence 21 to ring signal absence 22 and outputs ring signal ON time measured value 25.

Moreover, as ring signal OFF time 32 changes into the next ring signal ON time 33, ring signal measurement unit 202 detects presence 23 of the ring signal. Ring signal measurement unit 202 measures the time from ring signal absence 22 to ring signal presence 23 and outputs ring signal OFF time measured value 26.

Figure 11:
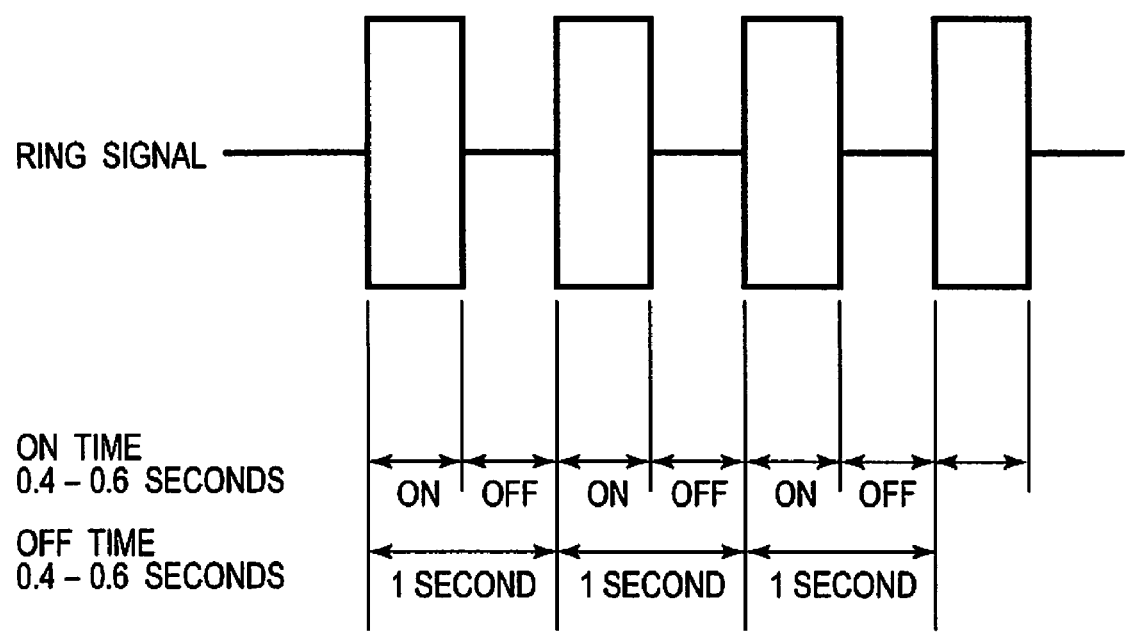
FIG. 11 is an explanatory view showing a ring signal in the case where the counterpart communication terminal device has a contract for a calling number display service.

FIG. 11 is an explanatory view showing the ring signal in the case where the counterpart communication terminal device has a contract for the calling number display service. As shown in a protocol of the ring signal in the drawing, when the counterpart communication terminal device has a contract for the calling number display service, the ON time of the ring signal coming from the exchange is in the range from 0.4 to 0.6 seconds while the OFF time thereof is in the range from 0.4 and 0.6 seconds, and the total of the ON time and the OFF time is equal to 1 second.

Figure 12:
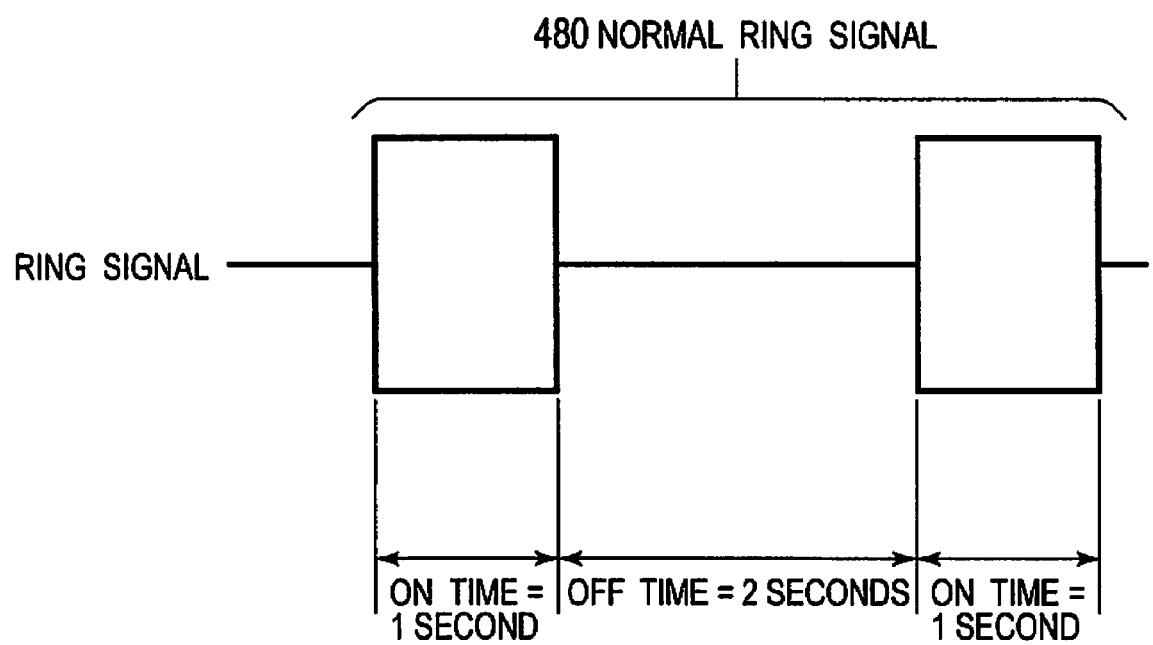
FIG. 12 is an explanatory view showing a ring signal in the case where the counterpart communication terminal device does not have a contract for the calling number display service.

Meanwhile, FIG. 12 is an explanatory view showing the ring signal in the case where the counterpart communication terminal device does not have the contract for the calling number display service. As shown in a protocol of a normal ring signal (480) in the drawing, the ring signal ON time is 1 second and the ring signal OFF time is 2 seconds when the counterpart communication terminal device does not have a contract for the calling number display service.

Figure 13:
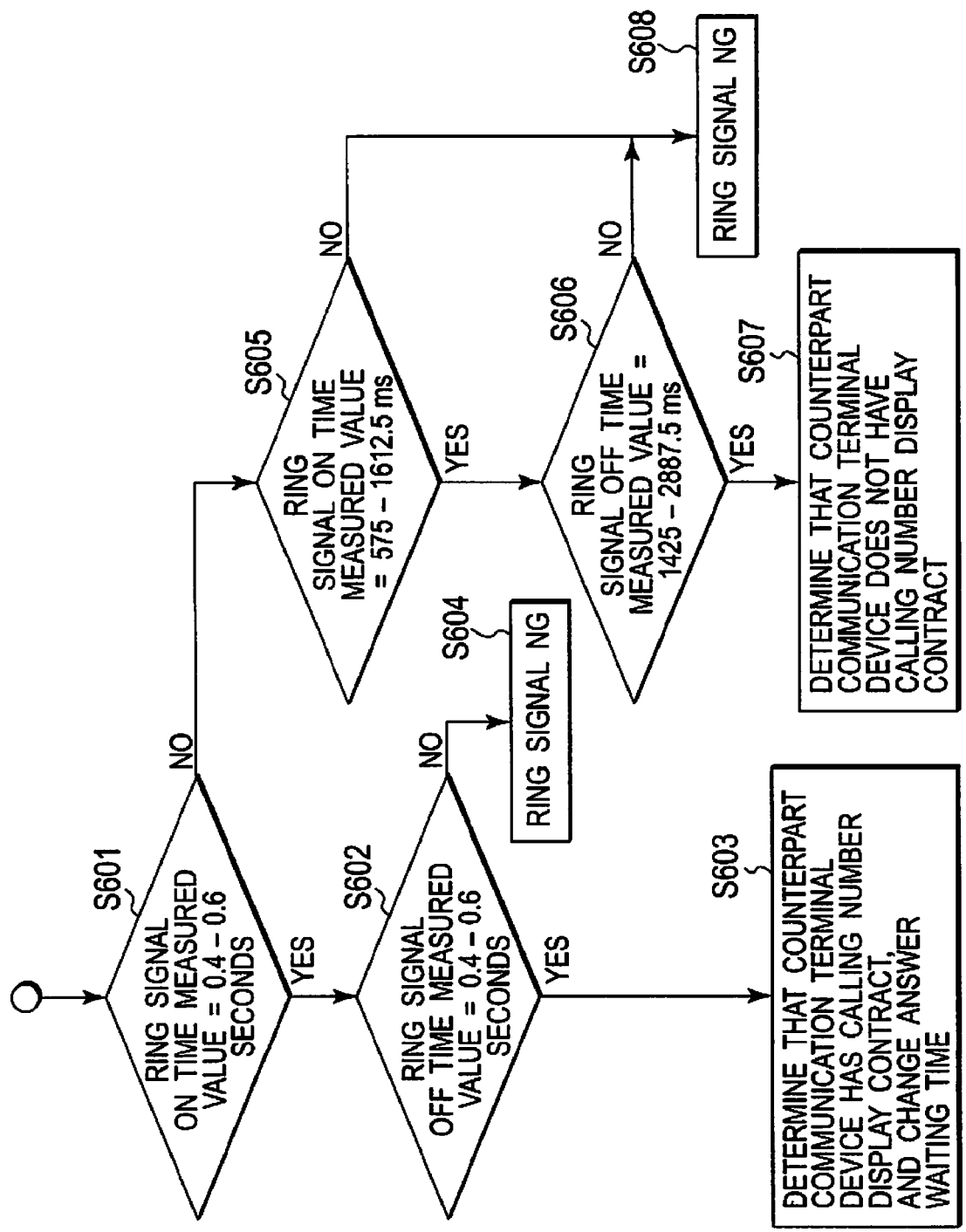
FIG. 13 is a flowchart showing an operation of communication counterpart information notification contract determination.

FIG. 13 is a flowchart showing an operation of communication counterpart information notification contract determination. The following description concerns how communication counterpart information notification contract determination unit 203 processes ring signal ON time measured value 25 and ring signal OFF time measured value 26 which are measured by ring signal measurement unit 202 as shown in FIG. 10. Regarding ring signal ON time measured value 25 and ring signal OFF time measured value 26 measured by ring signal measurement unit 202, communication counterpart information notification contract determination unit 203 first determines whether or not ring signal ON time measured value 25 is in the range from 0.4 to 0.6 seconds (Step 601). When the value falls in this range, communication counterpart information notification contract determination unit 203 determines if ring signal OFF time measured value 26 is in the range from 0.4 to 0.6 seconds (Step 602). If the value falls in this range, communication counterpart information notification contract determination unit 203 determines that the counterpart communication terminal device has a contract for the calling number display service (Step 603).

When communication counterpart information notification contract determination unit 203 determines that the counterpart communication terminal device has a contract for the calling number display service, communication counterpart information notification contract determination unit 203 causes communication controller 204 to set the response time to an appropriate time period so as not to allow communication terminal device 100 on the receiving side to recognize the information reception terminal start signal as the incoming call. Here, if the time has been set to one ring or 5 seconds, then the time is set to 10 seconds, for example. If the time has been set to 10 seconds, 15 seconds, or 20 seconds to begin, then it is not necessary to change the time. When the previous setting of one ring or 5 seconds is changed to 10 seconds, the content of change may be printed out in order to notify the user of the change after completion of communication.

Next, if ring signal ON time measured value 25 is out of the range from 0.4 to 0.6 seconds in Step 601 (No in Step 601), communication counterpart information notification contract determination unit 203 determines if ring signal ON time measured value 25 is in a range from 575 to 1612.5 ms (Step 605). When the value falls in this range, communication counterpart information notification contract determination unit 203 determines whether or not ring signal OFF time measured value 26 is in a range from 1425 to 2887.5 ms (Step 606). If the value falls in this range, communication counterpart information notification contract determination unit 203 determines that the counterpart communication terminal device does not have a contract for the calling number display service (Step 607). Communication counterpart information notification contract determination unit 203 retains the initially set value without instructing communication controller 204 to change the response time.

If ring signal OFF time measured value 26 is out of the range from 0.4 to 0.6 seconds in Step 602 (No in Step 602), communication counterpart information notification contract determination unit 203 determines a ring signal NG (Step 604). Meanwhile, when ring signal ON time measured value 25 is out of the range from 575 to 1612.5 ms in Step 605 or ring signal OFF time measured value 26 is out of the range from 1425 to 2887.5 ms in Step 606, communication counterpart information notification contract determination unit 203 determines a ring signal NG (Step 608). In any case, the signal is not treated as the regular ring signal so that communication terminal device 100 does not proceed with an incoming call mode.

When determination is made in Step 603 that the counterpart communication terminal device has a contract for the calling number display service, communication counterpart information notification contract determination unit 203 causes communication controller 204 to set the response time to the appropriate time period so as not to recognize the information reception terminal start signal as the incoming call as described above. In this case, the exchange is set to a secondary answer signal standby mode and sends out another ring signal to communication terminal device 100. This ring signal includes the ON time and the OFF time similar to the normal ring signal (480) shown in FIG. 12.

Figure 14:
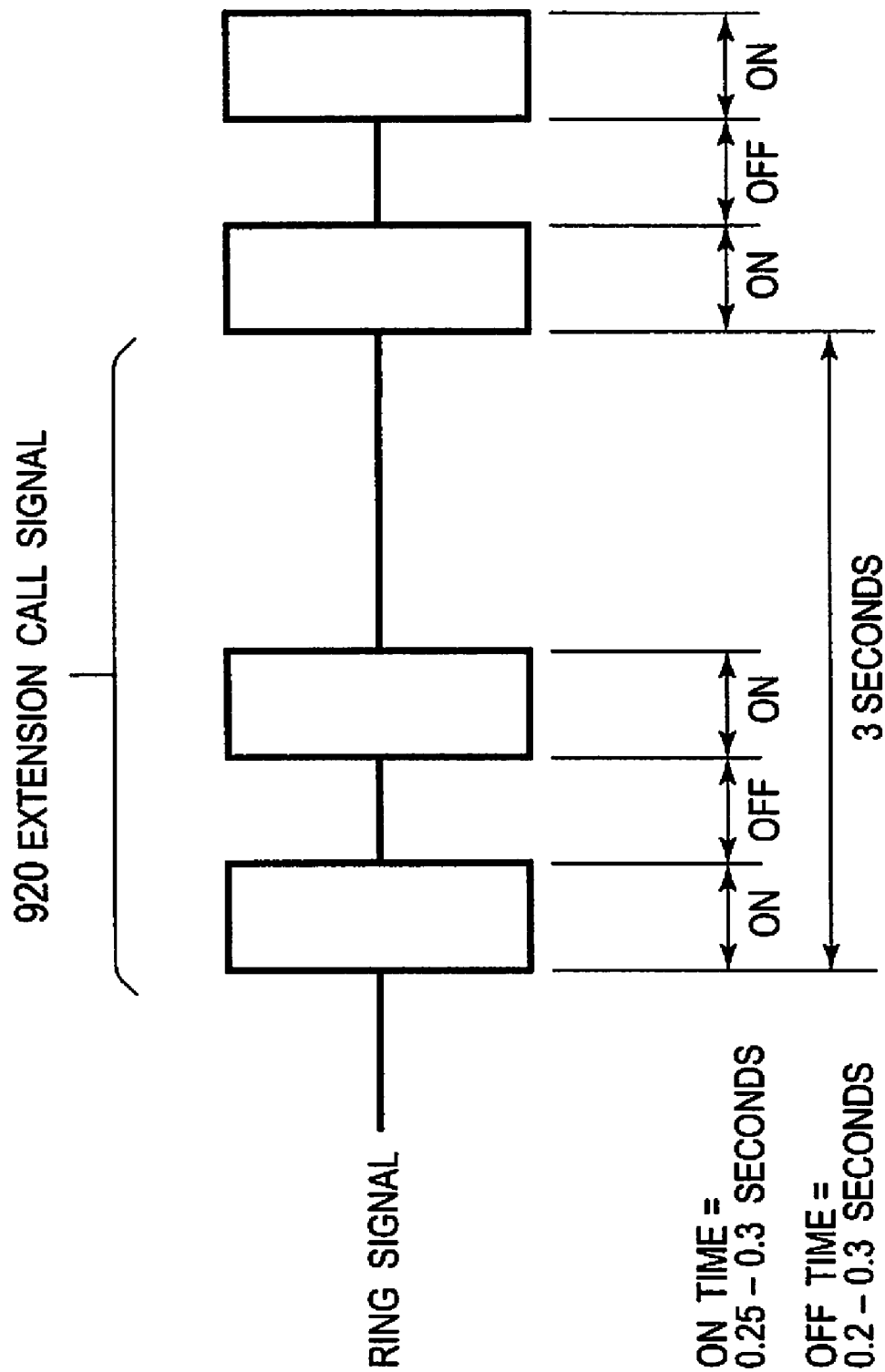
FIG. 14 is an explanatory view showing an example of a ring signal coming from a TA (terminal adaptor).

FIG. 14 is an explanatory view showing an example of the ring signal coming from TA (terminal adaptor) 102. Depending on the type of TA (terminal adaptor) 102, there may be a case in which the ON time and the OFF time, collectively called the double ring, is sent out as in a protocol of an extension call signal (920) shown in FIG. 14. At this time, a parameter for the minimum value of the ON time is set to 650 ms, for example, in order to establish an incoming call of the normal ring signal (480) shown in FIG. 12 with the ON time equal to 1 second and the OFF time equal to 2 seconds. This is because the signal becomes effective if the ON time is equal to or longer than 650 ms. However, since the extension call signal (920) shown in FIG. 14 has the ON time in a range from 0.25 to 0.3 seconds, which is inadequate for the ring signal ON time in light of the parameter value of 650 ms. Therefore, communication terminal device 100 does not proceed with the incoming call mode.

Accordingly, determination is made that the counterpart communication terminal device has a contract for the calling number display service (Step 603), the parameter for the minimum value of the ring signal ON time is changed to 200 ms, for example, to notify communication controller 204 and to cause communication terminal device 100 to proceed with the incoming call mode even in the case of the extension call signal (920) shown in FIG. 14 (see the ring signal (307) in FIG. 3). Here, since the parameter for the minimum value of the ring signal ON time is set to 200 ms, for example, communication terminal device 100 proceeds with the incoming call mode with the ring signal shown in FIG. 12. Accordingly, there is no problem.

As described above, according to the first embodiment, it is possible to prevent an influence of a delay or discard of a packet on the IP line, and to avoid the signal transmitted from the receiver to the transmitter at the time of the calling number display sequence from being blocked by the exchange. Therefore, the receiver can recognize an incoming call when the ring signal sent from TA (terminal adaptor) 102 is ambiguous. Hence there is an advantageous effect that the communication terminal device can receive a facsimile call at any time.

Second Embodiment

Figure 15:
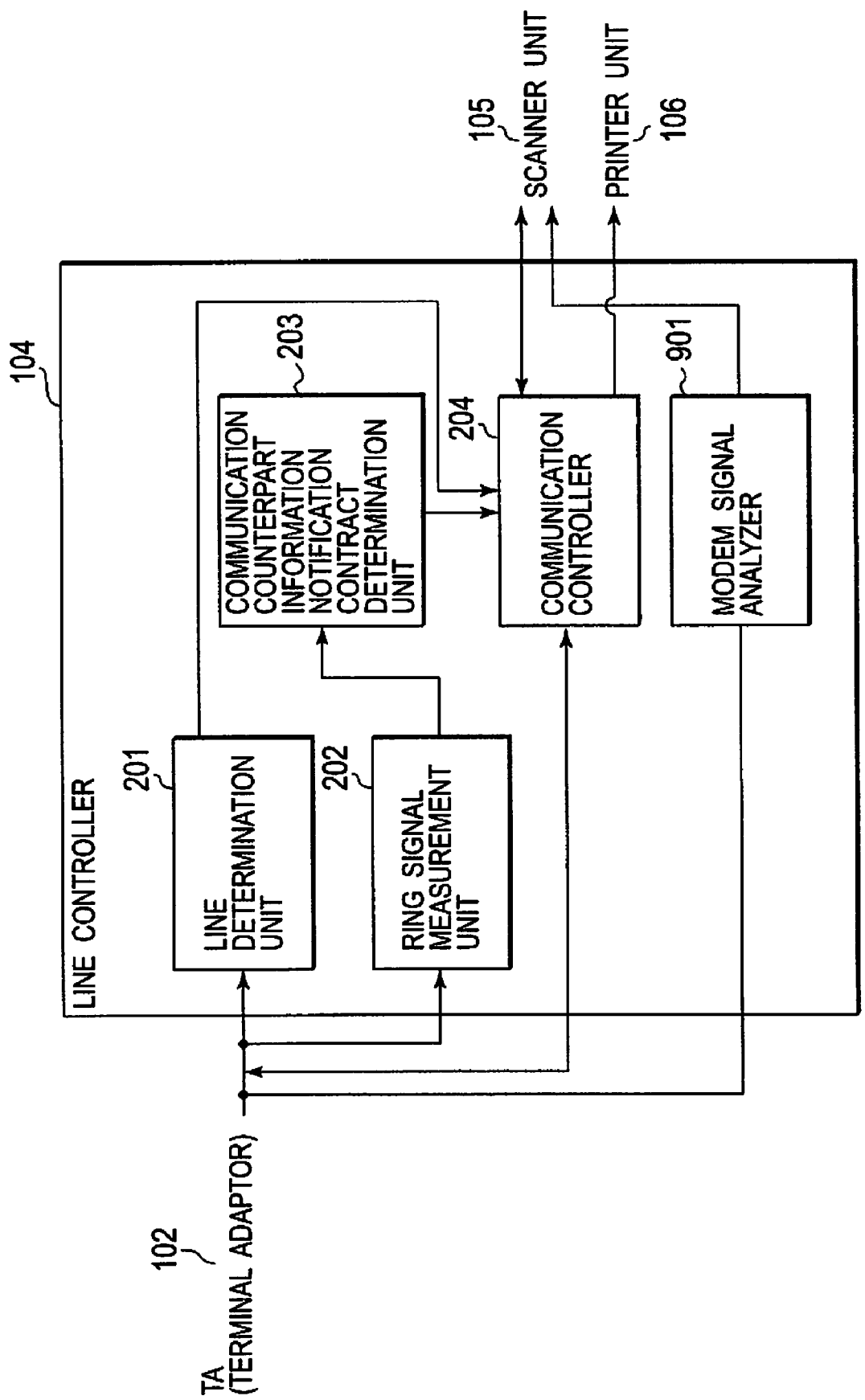
FIG. 15 is a block diagram of the circuit controller in a second embodiment.

Next, a second embodiment is described. FIG. 15 is a block diagram of circuit controller 104 in a second embodiment. In the second embodiment, MODEM signal analyzer 901 is added to the constituents of circuit controller 104 according to the first embodiment shown in FIG. 2. Other constituents are the same as the constituents in the first embodiment and are therefore designated by the same reference numerals.

MODEM signal analyzer 901 is connected to TA (terminal adaptor) 102 and scanner unit 105. MODEM signal analyzer 901 analyzes a MODEM signal from the unillustrated exchange and obtains information on a telephone number of a caller. The telephone number of the caller is displayed on an unillustrated LCD serving as outputting means.

Figure 16:
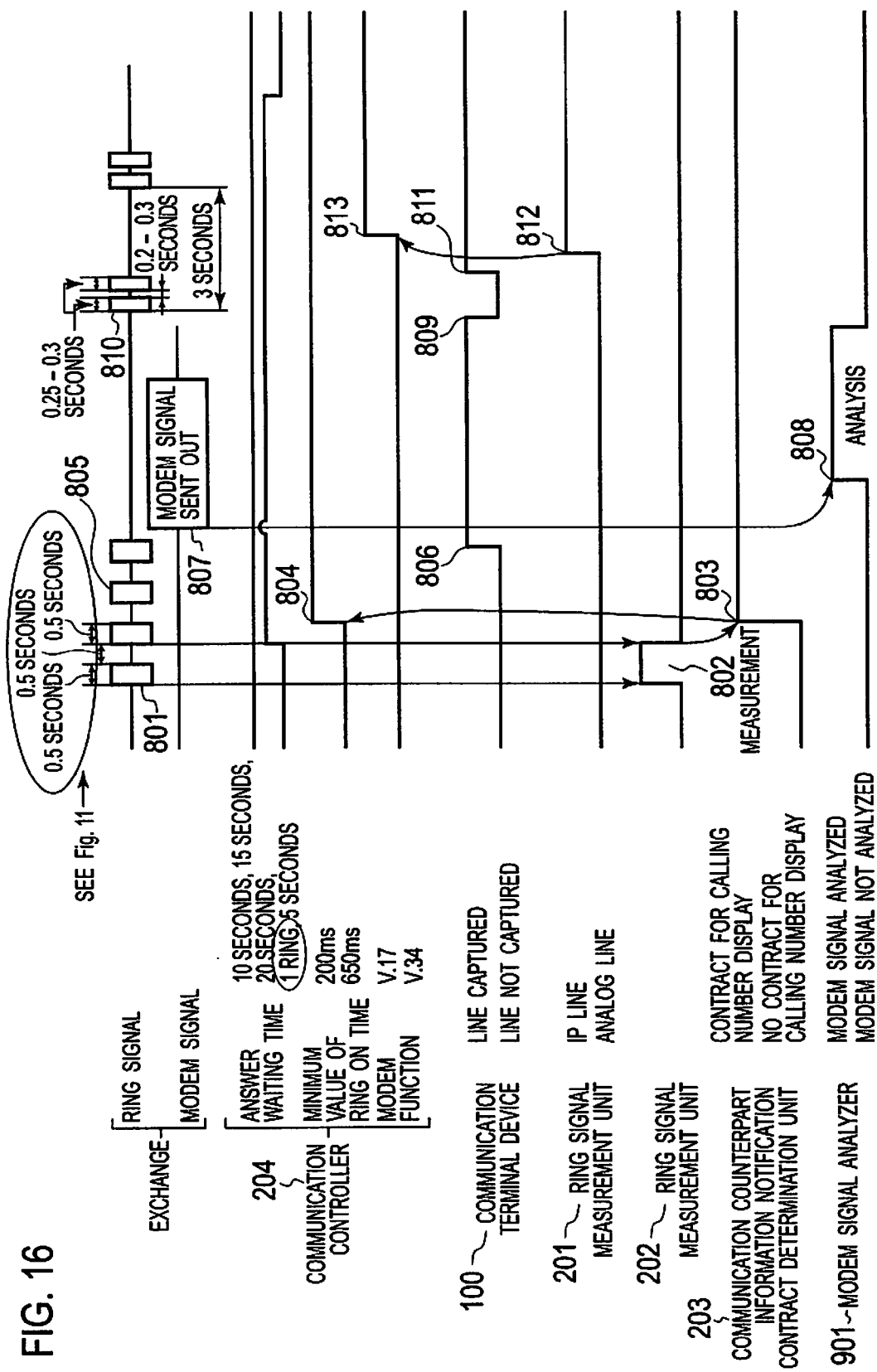
FIG. 16 is an operation time chart in the second embodiment.

FIG. 16 is an operation time chart in the second embodiment. When a facsimile call comes from the unillustrated counterpart communication terminal, a ring signal (801) comes from the exchange to communication terminal device 100. The ON time and the OFF time in this signal are measured (802) by ring signal measurement unit 202 of circuit controller 104. When ring signal measurement unit 202 determines that the measured values represent time for an information reception terminal start signal (801), ring signal measurement unit 202 notifies communication counterpart information notification contract determination unit 203. Upon receipt of this notice, communication counterpart information notification contract determination unit 203 determines that the counterpart communication terminal has a contract for the calling number display service (803).

When communication counterpart information notification contract determination unit 203 determines that the counterpart communication terminal has a contract for the calling number display service, communication controller 204 changes the minimum value of the ring signal ON time from 650 ms into 200 ms (804). Here, communication terminal device 100 is assumed to connect to the line (806) irrespective of what value the response time of communication controller 204 is set to at the information reception terminal start signal (805). As a consequence, the exchange sends out the MODEM signal (807).

MODEM signal analyzer 901 analyzes the MODEM signal (808). In this way, MODEM signal analyzer 901 obtains the information on the telephone number of the caller and sends the information on the telephone number of the caller to scanner unit 105. Scanner unit 105 stores the information on the telephone number of the caller in an unillustrated memory.

Communication terminal device 100 disconnects the line once in order to inform the exchange of completion of reception of the MODEM signal (809). In return, the exchange sends out a ring signal again to communication terminal device 100 (810). The ring signal at this time is either based on the protocol of the ring signal (480) shown in FIG. 12 or based on the protocol of the extension call signal (920) shown in FIG. 14. In the case of the normal ring signal (480) shown in FIG. 12, the parameter is set to 200 ms, for example. Therefore, communication terminal device 100 can recognize an incoming call.

Upon arrival of any one of the normal ring signal (480) and the ring of the extension call signal (920), communication controller 204, before causing communication terminal device 100 to proceed with an incoming call mode, instructs an unillustrated LCD or the like of scanner unit 105 functioning as outputting means to display the telephone number of the caller or to inform of the telephone number with a voice using an unillustrated speaker or the like. Communication terminal device 100 captures the line in accordance with the defined value of the response time. Here, the setting is defined as one ring (811). Line determination unit 201 determines if the line is an analog line. When the line is determined as the IP line (812), the modem function of communication controller 204 is changed from V. 34 to V. 17 (813). In this way, communication terminal device 100 can perform reception normally.

When the value of the response time is set to one ring or 5 seconds, the incoming call reception may be delayed from the set response time due to an operation of notifying a user of the telephone number of the calling number display service by displaying it or by reading it aloud. In this case, a notification of such delay of the incoming call reception may be printed out after the completion of the communications.

In above embodiments, the contract for the calling number display service includes not only physical contract for the calling number display, but also joining the calling number display service, or using the calling number display service. The calling number display service in the embodiment includes a service to notify the information such as a telephone number of the caller on communication. The contract for notifying the caller's information includes not only physical contract for notifying the caller's information, but also joining the service for notifying the caller's information, or using the service for notifying the caller's information.

As described above, according to the second embodiment, it is possible to extract and display the telephone number of the caller by providing MODEM signal analyzer 901.

Moreover, the communication terminal device of this embodiment may be a MFP or a facsimile, for example. Here, it is also possible to apply this embodiment to a complex system in which a scanner and a printer are connected through a network.

As described above, according to the communication terminal device and the reception control method for the communication terminal device of this embodiment, it is possible to recognize an incoming call reliably and thereby to receive a facsimile signal in the case where a communication network is connected to the IP line and when the counterpart communication terminal device has a contract for the calling number display service, for example.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A communication terminal device comprising:
   a communication counterpart information notification contract determination unit configured to determine if a counterpart communication terminal device communication received through a line has a communication counterpart information notification contract; and
   a communication controller configured to change a communication time parameter when the communication counterpart information notification contract determination unit determines that the counterpart communication terminal device of the received communication has the communication counterpart information notification contract.

2. The communication terminal device of claim 1, further comprising:
   a ring signal measurement unit configured to measure ON-and-OFF time of a ring signal included in a signal from the line, wherein
   the communication counterpart information notification contract determination unit determines if the counterpart communication terminal device has the communication counterpart information notification contract, based on a result of measurement by the ring signal measurement unit.

3. The communication terminal device of claim 1, wherein the communication counterpart information notification contract determination unit determines if the counterpart communication terminal device has a contract for a calling number display service.

4. The communication terminal device of claim 2, wherein the communication time parameter is a time period for which the communication terminal device waits to recognize an incoming call after an arrival of the ring signal at the communication terminal device.

5. The communication terminal device of claim 2, wherein the communication time parameter is a minimum value of the ON time during which the ring signal needs to be ON to be determined as effective.

6. The communication terminal device of claim 1, further comprising:
   a line determination unit configured to determine if the line is an analog line, wherein
   the communication controller changes its modem function to a V. 17 modem function when the line determination unit determines that the line is not the analog line.

7. The communication terminal device of claim 1, further comprising:
   a MODEM signal analyzer configured to analyze a MODEM signal included in the line and to extract a caller's telephone number included in the MODEM signal; and
   a display controller configured to perform control to output the caller's telephone number extracted by the MODEM signal analyzer to a display unit.

8. A reception control method for a communication terminal device comprising:
   detecting whether a counterpart communication terminal device has a communication counterpart information notification contract, based on a ring signal included in a signal received from a line; and
   changing a communication time parameter when a result of the detection indicates that the counterpart communication terminal device has the communication counterpart information notification contract.

9. The method of claim 8, further comprising:
   measuring ON-and-OFF time of the ring signal included in the signal from the line, wherein
   the detection is made by detecting whether or not the counterpart communication terminal device has the communication counterpart information notification contract, based on a result of the measurement.

10. The method of claim 8, wherein the detection is made by detecting whether the counterpart communication terminal device has a contract for a calling number display service.

11. The method of claim 8, wherein the communication time parameter is a time period for which a call-receiver communication terminal device waits to recognize an incoming call after an arrival of the ring signal.

12. The method of claim 8, wherein the communication time parameter is a minimum value of the ON time during which the ring signal needs to be ON to be determined as effective.

13. The method of claim 8, further comprising:
determining if the line is an analog line; and
changing a modem function to a V. 17 modem function when a result of the determination indicates that the line is not the analog line.

14. The method of claim 8 further comprising:
analyzing a MODEM signal included in the signal from the line;
extracting a caller's telephone number included in the MODEM signal; and
displaying the extracted caller's telephone number.

\* \* \* \* \*